J. W. Brewster,
Wrench.
Nº 24,190.        Patented May 31, 1859.
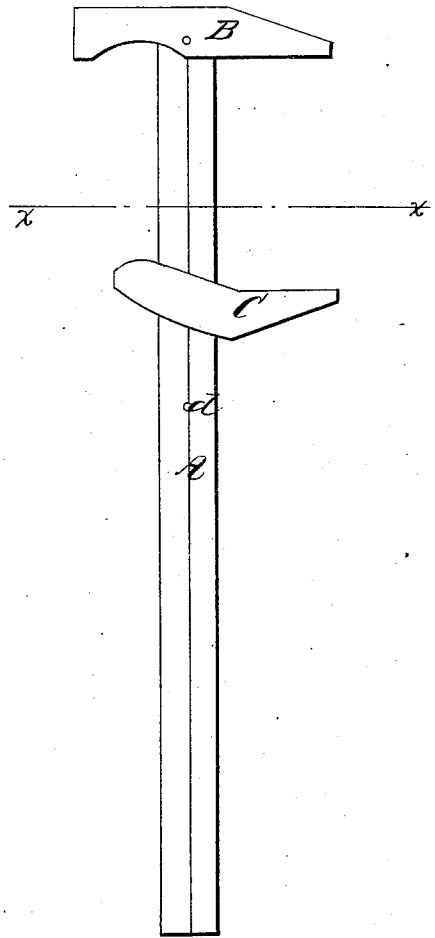
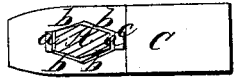
Witnesses:
John O. Brewster
G. H. Gardner
Inventor:
John W. Brewster

UNITED STATES PATENT OFFICE.

JOHN W. BREWSTER, OF STAMFORD, NEW YORK.

WRENCH.

Specification of Letters Patent No. 24,190, dated May 31, 1859.

*To all whom it may concern:*

Be it known that I, JOHN W. BREWSTER, of Stamford, in the county of Delaware and State of New York, have invented a new and Improved Wrench; and I do hereby declare that the following is a full, clear, and exact description of the same, reference being had to the annexed drawings, making a part of this specification, in which—

Figure 1, is a side view of my invention. Fig. 2, is a transverse section of do. taken in the line $x$, $x$, Fig. 1.

Similar letters of reference indicate corresponding parts in the two figures.

To enable those skilled in the art to fully understand and construct my invention I will proceed to describe it.

A, represents the handle or shank of the implement having the stationary jaw B, attached to its upper end. This handle or shank is of metal and is a six-sided bar, two opposite sides $a$, $a$, being parallel with each other and the remaining sides $b$, having oblique positions relatively with each other as shown clearly in Fig. 2. The handle transversely is of oblong form, the sides $a$, $a$, being the narrowest.

C, is the sliding or movable jaw which is fitted on the handle or shank A. This jaw C, has an eye $c$, made through it of a form corresponding to but larger than a transverse section of the handle or shank. The jaw C, is allowed to slide freely on the handle or shank and is prevented from casually slipping entirely off from it by a pin $d$.

By referring to Fig. 2, the increased size of the eye $c$, over the handle will be readily seen, and it will also be seen that the edges of the sides $a$, $a$, of the handle or shank are the parts nearest in contact with the edges or sides of the eye $c$.

The implement is used as follows: The handle or shank A, is grasped by the hand as usual, the jaw B, being placed on or applied to one side of the nut and the sliding or movable jaw C, shoved up to the opposite side of the nut by hand. When the implement is turned the movable or sliding jaw C, is canted on the handle or shank A, and the edges of the sides $a$, $a$, of the handle will bind in the ends of the eye $c$, of the jaw and thereby hold jaw C, perfectly secure on the handle or shank without the intervention of any extraneous device, and the greater the force required to turn the implement when applied to its work the firmer will the jaw C, be secured, thereby preventing the possibility of its slipping.

The jaw C, may be slightly curved as shown in the drawing so as to have the portion through which the handle or shank passes rather inclined or in an oblique position relatively with the handle when the outer portion is at right angles with the handle or shank. This form of the jaw C, would perhaps be preferable as it would allow the eye $c$, to be made larger than otherwise and at the same time preserve the parallelism of the jaws, that is, the portions that grasp the nut, when the jaw C, is bound tight on the handle.

This implement is very strong and durable may be constructed at a comparatively small cost and is capable of being used advantageously in all cases where wrenches are employed.

Having described my invention, I claim and desire to secure by Letters-Patent, as an improved article of manufacture,—

A wrench having a six-sided handle A, stationary jaw B, and sliding jaw C, with aperture ($c$) of the peculiar form shown, and the article being otherwise made as herein set forth.

JOHN W. BREWSTER.

Witnesses:
JOHN O. BREWSTER,
G. W. GARDNER.